United States Patent
Pyun et al.

(10) Patent No.: US 8,932,668 B2
(45) Date of Patent: Jan. 13, 2015

(54) METALLIC MAGNETIC POWDER AND MANUFACTURING METHOD OF THE SAME, MAGNETIC PAINTING, MAGNETIC POWDER FOR MAGNETIC THERAPY, AND MAGNETIC RECORDING MEDIUM

(75) Inventors: Dong Chul Pyun, Tucson, AZ (US);
Heemin Yoo, Tucson, AZ (US);
Hirohisa Omoto, Tokyo (JP); Takayuki Yoshida, Tokyo (JP)

(73) Assignees: The Arizona Board of Regents on Behalf of The University of Arizona, Tuscon, AZ (US); Materials Co., Ltd., Tokyo (JP)

( * ) Notice: Subject to any disclaimer, the term of this patent is extended or adjusted under 35 U.S.C. 154(b) by 522 days.

(21) Appl. No.: 13/103,410

(22) Filed: May 9, 2011

(65) Prior Publication Data
US 2011/0305924 A1  Dec. 15, 2011

(30) Foreign Application Priority Data
May 12, 2010  (JP) .................. 2010-110360

(51) Int. Cl.
B22F 1/02 (2006.01)
B22F 1/00 (2006.01)
G11B 5/706 (2006.01)

(52) U.S. Cl.
CPC ............ *B22F 1/0062* (2013.01); *B22F 1/0088* (2013.01); *B22F 1/02* (2013.01); *G11B 5/70615* (2013.01); *G11B 5/70621* (2013.01)
USPC .......................................... 427/127; 427/212

(58) Field of Classification Search
None
See application file for complete search history.

(56) References Cited

U.S. PATENT DOCUMENTS 4,113,528 A * 9/1978 Tokuoka et al. ............... 148/105
4,533,565 A * 8/1985 Okita ............................ 427/502
(Continued)

FOREIGN PATENT DOCUMENTS

| EP | 1343149 A2 | 9/2003 |
| EP | 1510274 A2 | 3/2005 |

(Continued)

OTHER PUBLICATIONS

Aoyama et al. "Improvement of dispersibility of iron oxide magnetic particles by dispersion in water and displacement of solvent" The ceramic society of Japan 97 (1) 1989 p. 73-78.*
(Continued)

*Primary Examiner* — Mandy Louie
(74) *Attorney, Agent, or Firm* — Oliff PLC

(57) ABSTRACT

A metallic magnetic powder where a primary particle of each metallic magnetic particle is a powder without forming an aggregate, and a method of making the same that includes manufacturing a metallic magnetic powder constituted of metallic magnetic particles, containing a metallic magnetic phase, with Fe, or Fe and Co as main components, rare earth elements, or yttrium and one or more non-magnetic components removing the non-magnetic component from the metallic magnetic with a reducing agent, while making a complexing agent exist for forming a complex with the non-magnetic component in water; oxidizing the metallic magnetic particle with the non-magnetic component removed; substituting water adhered to the oxidized metallic magnetic particle with an organic solvent; and
coating the surface of the metallic magnetic particle with an organic matter different from the organic solvent, while maintaining a wet condition of the metallic magnetic particle with the organic solvent adhered thereto.

5 Claims, 2 Drawing Sheets

( a ) Case of substituting a solvent ( b ) Case of not substituting the solvent

(56) References Cited

U.S. PATENT DOCUMENTS 6,129,847 A * 10/2000 Wunsch et al. ............... 210/695
2007/0227302 A1 * 10/2007 Yoshida et al. ................ 75/348

FOREIGN PATENT DOCUMENTS

| EP | 1840905 A1 | 10/2007 | |
| JP | 59-175706 | * 10/1984 | ............... H01F 1/02 |
| JP | A-2003-263720 | 9/2003 | |
| JP | A-2007-294841 | 11/2007 | |
| JP | A-2009-84600 | 4/2009 | |

OTHER PUBLICATIONS

Molecular weight of Acetone [NIST] <http://webbook.nist.gov/cgi/cbook.cgi?ID=C67641&Mask=200> accessed Sep. 27, 2013.*

Jan. 17, 2013 Extended European Search Report issued in European Patent Application No. 12006129.6.

* cited by examiner (a) Case of substituting a solvent (b) Case of not substituting the solvent ic recording medium, represented by the one used for the purpose of backup of data in a computer. In order to achieve a high recording density, it appears that a magnetic powder with small particle volume is requested. In order to respond to such a request, after examination regarding metallic magnetic powder, inventors of the present invention disclose patent documents 1 to 3, and so forth.
METALLIC MAGNETIC POWDER AND MANUFACTURING METHOD OF THE SAME, MAGNETIC PAINTING, MAGNETIC POWDER FOR MAGNETIC THERAPY, AND MAGNETIC RECORDING MEDIUM

BACKGROUND OF THE INVENTION

1. Field of the Invention

The present invention relates to a composite metallic magnetic powder and a manufacturing method of the same used for high density magnetic recording, a magnetic painting, magnetic powder for magnetic therapy, and a magnetic recording medium.

2. Description of Related Art

Further higher recording density is desired in accordance with increase in capacity of the magnetic recording medium, represented by the one used for the purpose of backup of data in a computer. In order to achieve a high recording density, it appears that a magnetic powder with small particle volume is requested. In order to respond to such a request, after examination regarding metallic magnetic powder, inventors of the present invention disclose patent documents 1 to 3, and so forth.

Patent document 1 discloses a ferromagnetic iron alloy powder for magnetic recording medium, comprising acicular particles having an average major axis diameter (X) of 20 nm or larger and 80 nm or smaller, having an oxygen content of 15 wt. % or larger and a coercive force (Hc) of $0.0036X^3 - 1.1X^2 + 110X - 1,390$ (Oe) or larger.

Patent document 2 discloses a technique of improving magnetic characteristics per unit volume, by dissolving and removing a non-magnetic component that exists on the surface of the metallic magnetic powder, by using a reducing agent, etc.

As a development of the patent document 2, patent document 3 discloses a technique of forming a layer of carbon on the surface of the metallic magnetic particle by coating the surface of the metallic magnetic particle with an organic matter and applying re-reduction treatment thereto.

(Patent document 1) Japanese Patent Laid Open Publication No.2003-263720
(Patent document 2) Japanese Patent Laid Open Publication No.2007-294841
(Patent document 3) Japanese Patent Laid Open Publication No.2009-084600

OUTLINE OF THE INVENTION

Problem to be Solved by the Invention

Patent document 1 discloses a metallic magnetic particle for a magnetic recording medium capable of exhibiting high magnetic characteristics even in the form of a fine particle, and a manufacturing method of the metallic magnetic powder. However, when the metallic magnetic powder is composed of ultrafine particles, an oxide layer made of a non-magnetic component formed on the surface of each ultrafine particle becomes thick to thereby secure stability of the ultrafine particle. Then, decrease of the magnetic characteristics is observed.

In order to solve the above-described problem, patent document 2 discloses a technique of downsizing the metallic magnetic particle by removing the non-magnetic component formed on the surface of the ultrafine particle by using the reducing agent. However, when an object is coated with a painting using the metallic magnetic particles, this involves a problem that an aggregate of the metallic magnetic particles are formed.

Patent document 3 discloses a technique of depositing carbon derived from the organic matter, on the surface of the downsized metallic magnetic particle, and reducing the formation of the aggregate. However, the metallic magnetic particle with carbon deposited thereon is insufficient in stability in the painting, and in addition, due to the carbon existing on the surface, there is a problem that the kind of an applicable binder is limited.

As described above, the inventors of the present invention achieve a point that it is important to inhibit the aggregate of the particles and maintain the form of a primary particle of each metallic magnetic particle that constitutes the metallic magnetic powder, and consider it possible to achieve magnetic recording with further high density if the aggregate of the metallic magnetic particles can be inhibited in a coating film, etc, with which the object is coated.

In view of the above-described circumstance, the present invention is provided, and in order to solve the above-described problem, an object of the present invention is to provide a metallic magnetic powder which is formed, without forming an aggregate of a primary particle of each metallic magnetic particle that constitutes the metallic magnetic powder.

SUMMARY OF THE INVENTION

After strenuous examination regarding the above-described problem, it is found that the metallic magnetic powder can be obtained by coating the surface of each particle with an organic matter, each particle constituting the metallic magnetic powder in a state of maintaining a wet condition after removing a non-magnetic component of the metallic magnetic powder, wherein each metallic magnetic particle constituting the metallic magnetic powder maintains the form of a primary particle of the metallic magnetic particle. Thus, the present invention is completed.

Namely, in order to solve the above-described problem, a first invention provides a manufacturing method of a metallic magnetic powder, comprising the steps of:

manufacturing a metallic magnetic powder constituted of metallic magnetic particles, containing a metallic magnetic phase with Fe, or Fe and Co as main components, rare earth elements (wherein yttrium is also treated as the rare earth element), one kind or more non-magnetic components such as Al and Si;

removing the non-magnetic component from the metallic magnetic particles, by making a reducing agent act thereon, while making a complexing agent exist for forming a complex with the non-magnetic component in water;

oxidizing the metallic magnetic particle with the non-magnetic component removed;

substituting water adhered to the oxidized metallic magnetic particle, with an organic solvent; and coating the surface of the metallic magnetic particle with an organic matter different from the organic solvent, in a state of maintaining a wet condition of the metallic magnetic particle with the organic solvent adhered thereto. (0014)

A second invention provides the manufacturing method of the metallic magnetic powder according to the first invention, wherein the step of oxidizing the metallic magnetic particle is performed by using peroxide.

A third invention provides the manufacturing method of the metallic magnetic powder according to the first or the second invention, wherein the organic matter different from the organic solvent covering the surface of the metallic magnetic particle, has a molecular weight of 100 or more, which is larger than the molecular weight of the organic solvent.

A fourth invention provides the manufacturing method of the metallic magnetic powder according to any one of the first to third inventions, wherein the organic matter different from the organic solvent covering the surface of the metallic magnetic particle has a structure containing a sulfonic acid group and/or a phosphonic acid group.

A fifth invention provides the manufacturing method of the metallic magnetic powder according to any one of the first to fourth inventions, comprising the step of drying the metallic magnetic powder after the step of covering the surface of the metallic magnetic particle, with the organic matter different from the organic solvent.

A sixth invention provides a metallic magnetic powder constituted of metallic magnetic particles, comprising Fe, or Fe and Co as main components, having an average major axis diameter of 10 to 50 nm confirmed by a transmission electronic microscopic image, having a calculated particle volume of 2500 $nm^3$ or smaller, and having a value of a peak diameter calculated by a wet-type particle size measurement (DLS method) in a range of 10 to 200 nm.

A seventh invention provides the metallic magnetic powder according to the sixth invention, wherein a value of a relative ratio of the average major axis diameter obtained by the transmission electronic microscopic image, and a peak diameter calculated by the DLS method is 5 or smaller.

An eighth invention provides a metallic magnetic powder constituted of metallic magnetic particles, having a metal phase comprising Fe, or Fe and Co as main components, having an oxide layer on the surface of the metal phase, with the surface of the oxide layer coated with an organic matter having a molecular weight of 100 or larger.

A ninth invention provides the metallic magnetic powder according to the eight invention, wherein the organic matter is a high molecule having polydispersity of 1.05 to 2.0.

A tenth invention provides the metallic magnetic powder according to the eight or ninth invention, wherein the organic matter has a structure containing a sulfonic acid group and/or a phosphonic acid group.

An eleventh invention provides a magnetic painting adopting the metallic magnetic powder according to any one of the sixth to ninth inventions.

A twelfth invention provides a magnetic powder for magnetic therapy adopting the metallic magnetic powder according to any one of the sixth to tenth inventions.

A thirteenth invention provides a magnetic recording medium manufactured by using the metallic magnetic powder according to anyone of the sixth to ninth inventions.

Advantage of the Invention

The metallic magnetic powder according to the present invention is the metallic magnetic powder, wherein each particle maintains the form of a primary particle, and contributes to magnetic recording with high density.

Figure 1:
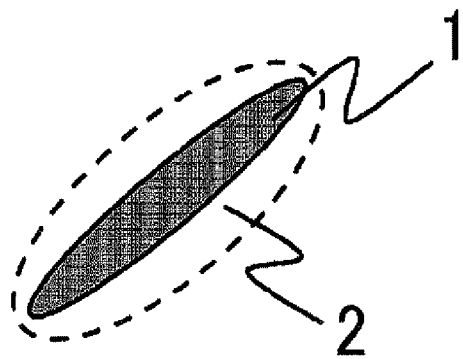
FIG. 1 is a schematic view showing a state of a metallic magnetic particle.
Figure 1:
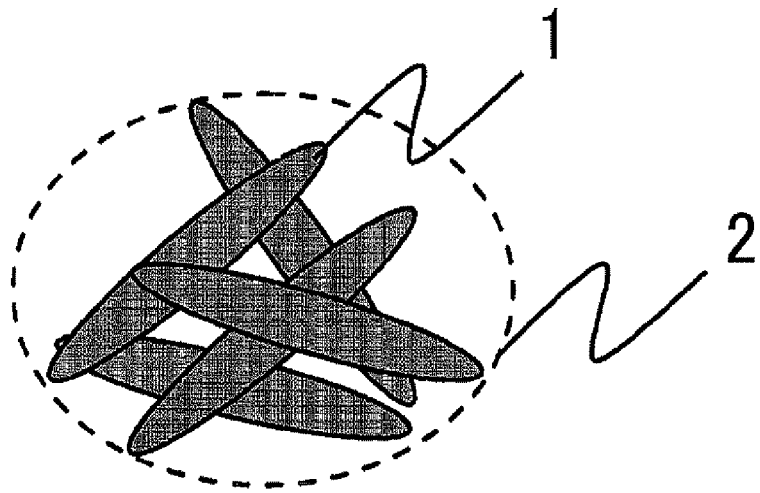

DESCRIPTION OF PREFERRED
EMBODIMENTS OF THE INVENTION

The following case can be given as an embodiment of the present invention. First, regarding a metallic magnetic particle and a manufacturing method of the metallic magnetic powder, the metallic magnetic powder manufacturing step, the non-magnetic component removing step, the wet-type stabilization step, the solvent substituting step, and the organic matter coating step will be described sequentially, and next, regarding physical characteristics of the metallic magnetic particle and the metallic magnetic powder, particle shape and volume, the form of the particle, specific surface area of the particle, composition analysis of powder, evaluation of powder magnetic characteristics, and evaluation of a single layer magnetic tape will be described sequentially.

<Metallic Magnetic Powder Manufacturing Step>

The manufacturing step of the metallic magnetic powder according to the present invention will be described. The metallic magnetic powder can be manufactured by a publicly-known method.

An example of a specific method of the metallic magnetic powder manufacturing step will be described.

First, iron oxyhydroxide, with a ratio of Co to Fe in atomic ratio (called "Co/Fe atomic ratio" hereafter) set in a range of 0 to 50 at %, is manufactured as a precursor substance. As a manufacturing method of the iron oxyhydroxide, a method of adding an aqueous ferrous salt solution to a carbonate solution, thereby generating iron carbonate (caustic alkali may be added as needed), then adding oxygen-containing gas to generate a nucleus crystal, and thereafter growing a particle to form iron oxyhydroxide, and a method of adding the caustic alkali singularly to the aqueous ferrous salt solution to form iron oxyhydroxide, can be used.

At this time, a precursor of the metallic magnetic powder applied to the present invention is formed by adjusting the growth of the iron oxyhydroxide, being a raw material. Specifically, the major axis diameter of the iron oxyhydroxide is set to 10 to 100 nm.

The manufactured iron oxyhydroxide is filtered and washed by a publicly-known method, uniform heat treatment is applied thereto, and further at least one kind of rare earth elements (including yttrium), aluminium, and silicone are added thereto as a sintering preventive agent, which is then dried in an inert gas or in the air for 6 hours or more under condition of 80 to 300° C., to thereby obtain an iron oxyhydroxide dried solid material. By heating and dehydrating this solid material at 250 to 700° C. by a publicly-known method, an iron-based oxide such as $\alpha$-$Fe_2O_3$ is obtained.

Subsequently, the obtained iron oxide is reduced by vapor-phase reduction. Carbon monoxide, acethylene, and hydrogen, etc, can be given as reducing gases. Such a reducing operation can be performed by multi-step reduction wherein reduction is divided into first-step reduction and second-step reduction, at different temperatures in both steps. Specifically, the iron oxyhydroxide is reduced while maintaining a relatively low temperature in the first step, and is reduced while maintaining a high temperature in the second step, with a temperature increasing step interposed between the first step and the second step.

The metallic magnetic powder obtained after reduction has extremely high activity, and therefore there is a possibility of ignition if being handled in the atmosphere. Therefore, preferably a dense oxide layer is formed on the surface of the metallic magnetic particle by the oxidization step, so that the metallic magnetic particle can withstand handling in the atmosphere. In order to forma dense layer on the surface of the metallic magnetic particle, the metallic magnetic particle is cooled to a temperature in a range of 50 to 200° C. after the aforementioned reducing step, then weak oxidizing gas is introduced, and a stable oxide layer is formed on the surface of the metallic magnetic particle. If required, after the oxide layer is formed, the metallic magnetic particles may be exposed to a reduction atmosphere, and after a surface oxide layer modifying operation is performed, stabilization treatment may be applied to the surface again.

<Non-Magnetic Component Removing Step>

The non-magnetic component removing step is the step of removing a non-magnetic component such as aluminium and rare earth elements contained in the metallic magnetic powders manufactured by the aforementioned step, and obtaining the metallic magnetic powder, with particle volume reduced.

The non-magnetic component removing step is the step of removing a non-magnetic component such as aluminium and rare earth elements contained in the metallic magnetic powders manufactured by the aforementioned step, and obtaining the metallic magnetic powder, with particle volume reduced.

A specific method of the non-magnetic component removing step will be described.

A solution dissolving a compound (complexing agent) capable of forming a complex with at least one kind or more of the rare earth elements, aluminium, and silicone contained in the metallic magnetic powder obtained as described above, is prepared as a treatment liquid. As the complexing agent, ordinarily used chemicals in the electroless plating such as a citrate, a tartrate, a lactate, and a malate, can be used. The concentration of the complexing agent is preferably set to about 0.01 to 10 mol/L. Further, a substance having a pH buffer effect such as ammonium salt may be added as needed.

Next, the metallic magnetic powder is added to the treatment liquid. An amount of addition of the metallic magnetic powder is preferably about 1 to 100 g per 1 L of treatment liquid. Further, in order to maintain uniformity of the reaction in the liquid, stirring or forcible dispersion (for example, ultrasonic dispersion) is preferably performed.

The reducing agent is added after the metallic magnetic powder is uniformly dispersed into the treatment liquid. As such a reducing agent, a strong reducing agent such as hydrazine ($N_2H_2$), lithium aluminium hydride ($LiAlH_4$), and sodium boron hydride ($NaBH_4$) can be used. The concentration of the reducing agent is preferably set to 0.01 to 10 mol/L.

After this reducing agent is added, leaching operation is performed for 10 to 300 minutes while maintaining a liquid temperature at 10 to 50° C. The non-magnetic component is eluted into the treatment liquid by this leaching operation, thus relatively increasing an amount of magnetic elements in the particle of the metallic magnetic powder. Note that this reaction is preferably performed in an inert gas atmosphere.

Thus, the metallic magnetic particle comprising Fe, or Fe and Co as main components, having an average major axis diameter of 10 to 50 nm confirmed by a transmission electronic microscopic image, and having a calculated particle volume of 2500 $nm^3$ or smaller, can be obtained.

<Wet-Type Stabilization Step>

The wet-type stabilization step is the step of forming the oxide layer once, on the surface of the metallic magnetic particle with the non-magnetic component removed, under a wet condition without undergoing the drying step after the aforementioned non-magnetic component removing step.

Then, without undergoing the drying step, aggregation of the metallic magnetic particles can be inhibited by forming the oxide layer on the surface of the metallic magnetic powder with the non-magnetic component removed, by a wet-type method. In this wet-type stabilizing operation, the oxide layer is formed on the surface of the metallic magnetic powder. Wherein, in order to form a further suitable uniform layer on the surface of the metallic magnetic powder, peroxide, etc, is preferably used. Specifically, oxidizing agents such as inorganic peroxide and potassium chromate, and organic peroxide can be given. Wherein, the inorganic peroxide and particularly hydrogen peroxide is preferable in consideration of easiness of handling.

Here, when the metallic magnetic powder and the treatment liquid in the non-magnetic component removing step are separated and dried and thereafter the oxide layer is formed to thereby manufacture the magnetic powder, characteristics of a medium are less improved than expected in some cases, in spite of a remarkable reduction of the volume of the metallic magnetic particle. Regarding such a phenomenon, after examination by the inventors of the present invention, it is found that when the metallic magnetic powder and the treatment liquid are separated and dried and the oxide layer is thereafter formed to thereby manufacture the metallic magnetic powder, dispersability and compatibility with resin are deteriorated on the surface of the metallic magnetic particle, and further the metallic magnetic particles are aggregated again in the process of drying. As a result, when the metallic magnetic powder is turned into a form of coating, the metallic magnetic particles can not be sufficiently dispersed, and the volume of the metallic magnetic powder becomes greater than the volume of individual particle (increase of a so-called activation volume), and consequently an improvement effect can not be obtained, which is expected to be obtained by reduction effect of the volume of the metallic magnetic particle.

As an amount of addition of oxide in the wet-type stabilization step, peroxide of 0.001 mol or more, preferably 0.005 mol or more, and further preferably 0.01 mol or more, with respect to 1 g of the metallic magnetic powder to be treated, is added. By adding such an amount of oxide, preferably a suitable oxide layer can be formed, which is stabilized as the magnetic powder and improved in preservation stability.

Meanwhile, an upper limit of addition of the peroxide is preferably set to 0.05 mol or less, with respect to 1 g of the metallic magnetic powder to be treated. By setting the addition of the peroxide to the aforementioned amount or less, it is possible to prevent a case that oxidation reaction occurs at the same time on the surface of the metallic magnetic particle, and as a result, the suitable oxide layer can not be formed, and a case that the metallic magnetic particle receives excessive oxidation and the volume of a metal core is reduced, and as a result, such a metallic magnetic particle is not suitable as a high density magnetic recording material.

A reaction temperature in the wet-type stabilization step is preferably set to 0 to 50° C. and preferably set to 10 to 40° C., from a viewpoint of securing appropriate productivity, and from a viewpoint of securing formation of a uniform oxide layer by suppressing non-uniformity of reaction and improving the magnetic characteristics.

<Solvent Substituting Step>

The solvent substituting step is the step of substituting moisture covering the surface of the metallic magnetic particle once, for suppressing the aggregation of the metallic magnetic particles, when the metallic magnetic powder is turned into a dried powder.

A specific method of the solvent substituting step will be described.

After the aforementioned wet-type stabilization step, the obtained metallic magnetic powder and the treatment liquid are separated from each other. A publicly-known general method may be used as the separation method. Here, in order to remove a component generated during operation of the non-magnetic component removing step, which remains on the surface of the metallic magnetic particle, the separated metallic magnetic powder is dispersed into clean pure water again. At this time, the pure water is preferably stirred, or ultrasonic washing is preferably used.

After dispersion into the pure water, the separating operation is performed again, to separate the metallic magnetic powder and a washing liquid from each other, and thereafter the separated metallic magnetic powder is dispersed again into an organic solvent, to thereby obtain an organic solvent dispersion liquid of the metallic magnetic powder.

Note that by repeating the operation of separating the metallic magnetic powder and the organic solvent from each other by performing separating operation of the obtained metallic magnetic powder into the organic solvent dispersion liquid, and thereafter dispersing the separated metallic magnetic powder into the organic solvent again, the moisture remained on the surface of the metallic magnetic particle can be further substituted with the organic matter, and this is preferable.

There is no particular limit in a temperature condition of the solvent substituting operation. However, the operation is preferably performed at a lower temperature than a vaporization temperature of a used organic medium, from a viewpoint of operability.

As preferable examples of the organic solvent used in the solvent substituting operation, toluene, methyl ethyl ketone, and cyclohexanone can be given.

An effect of the solvent substituting step will be described, with reference to FIG. 1.

FIG. 1 is a schematic view showing a state of the metallic magnetic particle, wherein FIG. 1A shows a case that the solvent substituting step is executed, and FIG. 1B shows a case that the solvent substituting step is not executed.

When the solvent substituting step is executed, as shown in FIG. 1A, organic matter 2 as will be described later is coated with metallic magnetic particle 1 in the "organic matter coating step", without aggregation of the metallic magnetic particles. As a result, the metallic magnetic particle 1 coated with the organic matter, is not aggregated again from the first step to the final step, with the subsequent prescribed step interposed, and therefore the magnetic characteristics can be sufficiently exhibited.

Meanwhile, when the solvent substituting step is not executed, as shown in FIG. 1B, the organic matter 2 is coated with the metallic magnetic particle 1 in a state of aggregation. When such a state is formed once, the aggregation is not solved from the first step to the final step, with the subsequent prescribed step interposed, and therefore the magnetic characteristics can not be sufficiently exhibited.

<Organic Matter Coating Step>

The organic matter coating step is the step of further adding the organic matter to the organic solvent dispersion liquid of the metallic magnetic powder obtained by the solvent substituting step, and coating the surface of the metallic magnetic particle with the organic matter.

The organic matter used at this time is preferably a substance different from the aforementioned organic solvent and has a larger molecular weight than that of the organic solvent. By adding the organic matter, the organic matter is adsorbed on the surface of the metallic magnetic particle, and the magnetic powder is suitably dispersed in the organic solvent by benefit of the organic matter.

Here, as the organic matter, homopolymer, copolymer, random polymer, block copolymer, dendrimer, isotactic polymer, straight chain or branched polymer, star polymer, partial polymer, and graft copolymer can be given as examples. Here, the "polymer" is made by polymerizing two or more monomers, and includes a homopolymer, being the monomer, and a copolymer. Further, the polymer may be formed into various shapes, depending on the purpose of use.

Particularly, the polymer having an unsaturated structure such as an ethylene group is preferable as the polymer of the present invention. For example, N-functionalized polymer, (methane phemin) acrylic acid, vinyl polymer, conjugated high molecule such as polythiophene, styrene polymer, polyethylene glycol, polysiloxanes, polyethylene oxide, hydroxyl ethyl (methane phemine) acrylic acid, dimethyl amino ethyl (methane phemine) acrylic acid, polyacrylonitrile, polystyrene, polymethyl metha acrylate (PMMA), polypyrroles, protein, peptide, fluorescent polymer having straight chain or branched alkyl group, and also as the polymer having relatively low molecule, oleylamine, olein acid, and TOPO are given as examples.

Further, the polymer having carbon numbers of 1 to 24 is preferable as the polymer having the aforementioned structure. Moreover, such a polymer may be used singly or may be used in combination. Moreover, the polymer obtained by polymerizing the high molecule having one or preferably two or more unsaturated groups, and the monomer obtained by ethylenizing alkoxysilan, can also be used.

Among the substances having the above-described structure, it is preferable to use the polymer including polystyrene, polymethacrylate, polyacrylate, polyacrylonitrile, a vinyl group, and the polymer including polythiophene, polypyrrole, polyaniline.

Among the above-described organic matters, the one having a phosphonate group or a sulfonate group in its structure is preferable. This is because by having such a functional group adsorbed on the surface of the metallic magnetic particle, dispersability of the metallic magnetic particle in a magnetic painting, being a product as will be described later, can be secured.

The molecular weight of the organic matter adsorbed on the surface of the metallic magnetic particle is 100 or more, 100000 or less, and preferably 1000 or more and 50000 or less. This is because if the molecular weight is 100 or more, an effect of securing the dispersability of the metallic magnetic particle can be obtained, and if the molecular weight is 100000 or less, a presence amount of the organic matter per unit volume of the metallic magnetic particle can be secured, and an effect of securing the dispersability of the metallic magnetic particle can be obtained.

It is also preferable that the organic matter added to the magnetic painting, being the product as will be described later, namely a so-called binder component is previously adsorbed on the surface of the metallic magnetic particle. With this structure, when the magnetic painting is manufactured, it can be manufactured without adding a binder again, and this is preferable from the viewpoint of reducing the step.

The value of polydispersability of the high molecule used in the present invention falls within a range of 1 to 2, and more preferably within a range of 1.05 to 1.20. The value of the polydispersabiltiy is approximately 1, thereby showing an ideal polymer and this is preferable. When the polydispersability shows a value smaller than 2, uniform particle coating can be obtained, and such an organic matter can be used in the present invention.

The constituent ratio (weight ratio) of [metal]/[coating material (organic matter)] in the metallic magnetic particle of the present invention is preferably 10/90 to 90/10. Particularly, the ratio of a metal portion is set to be high for the purpose of use for the magnetic recording in which high magnetic characteristics are required, and the ratio of a coating material (organic matter) portion is set to be high for the purpose of use for DDS (Drug Delivery System) as will be described later in which not so high magnetic characteristics are required.

As the purpose of use other than the magnetic painting, being the product as will be described later wherein the metallic magnetic particle of the present invention is used, the purpose of use for a magnetic induction therapy (DDS) can be considered. In the magnetic induction therapy, the polymer is used in the painting and a medicine is contained in this polymer portion, so that the medicine can reach an affected part effectively by being guided by magnetism from outside. At this time, if there is less metal portion, such portion is hardly recognized as a foreign matter by a living body, and it is expected that rejection hardly occurs preferably in this case. Namely, mixture of a medicine component into a polymer structure portion, being the painting, is also one of the preferable embodiments of the present invention.

It is also preferable that after the operation of the organic matter coating step is ended, the metallic magnetic powder is dried to be a dry powder. This is because according to this structure, the aggregation is hardly generated by the effect that the surface of the metallic magnetic particle is coated with the organic matter, unlike a case that it is coated with water. Namely, this is because even if undergoing the drying step, the aggregation of the metallic magnetic powder hardly occurs, and relatively soft dry powder can be obtained. This is preferably suitable in handling.

Note that the drying step is preferably performed for a long time at a low temperature. Specifically, the temperature is set to 100° C. or less and preferably 80° C. or less.

(Physical Characteristics of the Metallic Magnetic Particle and Metallic Magnetic Powder)

Physical characteristics of the metallic magnetic particle and the metallic magnetic powder according to the present invention will be described.

<Particle Shape and Weight>

The metallic magnetic particle of the present invention is formed into a acicular, fusiform, or flat acicular shape. Here, the flat acicular particle is one of the embodiments of the acicular particles, wherein the shape of the particle obtained by being cut by the short axis is not a circle but an elliptical shape.

Discrimination can be made by TEM images. Specifically, there are a method of inclining the particle and confirming the degree of the separation of a cross-section from the circle, and a method of confirming the ratio of the cross-section by using shadowing. Note that the particle whose cross-section is determined to be a circle, is the fusiform particle.

The metallic magnetic particle of the present invention is set to have a size of 10 to 50 nm, preferably 10 to 45 nm, and further preferably 10 to 30 nm in a major axis diameter when the particle has the acicular shape or the shape similar to the acicular shape. By setting the size of the metallic magnetic particle within this range, such a metallic magnetic particle can contribute to high density magnetic recording.

When the major axis diameter is 50 nm or less, the size of the particle itself is not excessively large, and preferably the metallic magnetic powder constituted of such particles can be applied to the high density magnetic recording. Further, when the major axis diameter is 10 nm or more, a problem of super para of the magnetism can be preferably prevented. Moreover, in the high density magnetic recording, an axial ratio is also an important factor in a case of the metallic magnetic particle that exhibits magnetism by using magnetic shape anisotropy. However, in this case, the axial ratio may be 2 or more.

Further, in the metallic magnetic particle according to the present invention, when the particle, being approximately a cylindrical shape, is calculated, (namely, when obtaining a value calculated by (average short axis diameter/2)$^2 \times$circumference ratio$\times$average major axis diameter), the particle has a volume of 2500 nm$^3$ or less, and further fine particle has a volume of 2250 nm$^3$ or less, and more further fine particle has a volume of 2000 nm$^3$ or less. The finer particle with small volume, being approximately the cylindrical, contributes to reducing a particle-like noise. Accordingly, the fine particle with small volume, being approximately the cylindrical, is preferable. However, as described above, from the viewpoint of preventing the deterioration of the magnetic characteristics due to super para, the particle volume of 500 nm$^3$ or more is preferable.

In the metallic magnetic powder according to the present invention, components such as aluminium, silicone, and rare earth elements, are reduced. Specifically, the atomic ratio of [non-magnetic component (R+Si+Al)]/[magnetic component (Fe+Co)] is 20% or less, and when the aforementioned components are further reduced, the atomic ratio is 15% or less, and when the aforementioned components are more further reduced, the atomic ratio is 12% or less.

Note that in the present invention, the rare earth element containing yttrium is described as "R" in some cases.

When the metallic magnetic powder is manufactured, in order to prevent sintering of the metallic magnetic particle, the non-magnetic component exists outside of a metal core. Accordingly, by removing the non-magnetic component, the effect of reducing the volume of the metallic magnetic particle can be obtained. Further, by removing the non-magnetic component, higher magnetic characteristics per unit volume of the metallic magnetic particle can be obtained.

<Form of the Particle>

The average major axis diameter of the metallic magnetic particle according to the present invention, was measured by photographing an image obtained by observing the magnetic powder in a bright field under accelerated voltage of 100 kV by using a through electron microscope (Model: JEM-100CXMark-II by JEOL Ltd. About 300 particles were measured during this measurement.

A diameter of the aggregate of the metallic magnetic particles of the present invention was calculated by particle size measurement using DLS method.

Specifically, the diameter was calculated by using a DLS apparatus produced by OTSUKA ELECTRONICS Co, Ltd.

<Specific Surface Area of the Particle>

The specific surface area of the metallic magnetic particle of the present invention was measured by using a BET one point method. Specifically, the specific surface area was measured by using "4 SORB US" produced by YUASA-IONICS COMPANY, LIMITED., as a measurement apparatus.

<Composition Analysis of the Powder>

The composition of the metallic magnetic powder of the present invention was obtained by mass analysis of an entire body of the metallic magnetic particle containing a metallic magnetic phase and an oxide layer. Specifically, determinate quantities of Co, Al, and rare earth elements were measured by using a high-frequency inductive plasma emission analyzer ICP (IRIS/AP) produced by Nippon Jarrell-Ash Co. Ltd., and the determinate quantity of Fe was measured by using a HIRANUMA automatic titrator (COMTIME-980) produced by HIRANUMA SANGYO KK. The result of the determinate quantity is given by mass%, and therefore by suitably converting it to the atomic ratio (at %), Co/Fe atomic ratio, Al/(Fe+Co) atomic ratio, Y/(Fe+Co) atomic ratio, (R+Al+Si)/(Fe+Co) atomic ratio were obtained. Note that in each comparative example and each example, Si/(Fe+Co) is a measurement limit or smaller. Therefore, in these examples, (R+Al+Si)/(Fe+Co) atomic ratio is equal to (R+Al)/(Fe+Co) atomic ratio.

<Evaluation of the Powder Magnetic Characteristics>

A plastic container of 46 mm was filled with the metallic magnetic powder of the present invention, and by using a VSM apparatus (VSM-7P) produced by Toei Industry Co., Ltd., coercive force Hc(Oe, kA/m), saturation magnetization as ($Am^2$/kg), squareness ratio SQ, BSFD of a powder body (SFD value in a bulk state) were measured, in an external magnetic field of 10 kOe(795.8 kA/m).

<Evaluation of Dispersability of the Particle>

The dispersability of the metallic magnetic particles of the present invention can be evaluated by adding the obtained metallic magnetic particles into an organic solvent (such as cyclohexanone) and observing a sedimentation state.

Further, the dispersability can also be evaluated by measuring a particle size distribution of the metallic magnetic particles by DLS (Dynamic Light Scattering) method. By this measurement method, the particle size is measured by utilizing a state of the Brownian movement of the metallic magnetic particles. Accordingly, the particle size can be accurately measured by this method, and this means that independency of the metallic magnetic particle can be ensured.

Then, a value of a measured peak diameter (maximum point of a particle presence ratio (%) by weight conversion, obtained by the DLS measurement) falls within a range of 10 nm to 200 nm.

Meanwhile, a value of a relative ratio of the average major axis diameter and the peak diameter (peak diameter/average major axis diameter) was 5 or less.

<Evaluation of a Single Layer Magnetic Tape>

Regarding the metallic magnetic particle of the present invention, in order to confirm applicability to a medium, a single magnetic layer was formed and evaluated. An outline is based on the following formula.

Magnetic coating mother liquid is obtained by performing dispersion operation into the obtained metallic magnetic powder, prescribed binder, and prescribed solvent.

Thereafter, letdown solution for diluting the coating mother liquid was added to the obtained magnetic coating mother liquid, and the dispersion operation was performed again, to thereby manufacture a magnetic painting.

The obtained magnetic painting was applied to the surface of a polyethylene film. However, an undried polyethylene film was used for manufacturing a tape with non-oriented metallic magnetic particles, and the polyethylene film dried in a magnetic field was used for manufacturing the tape with oriented metallic magnetic particles, to thereby obtain the magnetic tape sample.

Magnetic measurement was performed for the magnetic tape sample as described above by using the VSM apparatus (VSM-7P) produced by Toei Industry Co., Ltd., and coercive force Hcx(Oe, kA/m), coercive force distribution SFDx in a parallel direction to the surface of the magnetic layer, greatest energy product BHmax, squareness ratio SQx in a parallel direction to the surface of the magnetic layer, squareness ratio SQz in a vertical direction to the surface of the magnetic layer, and orientation ratio OR were obtained.

EXAMPLES

Example 1

After 3000 mL of pure water was poured into a beaker of 5000 mL, the temperature was maintained to 30° C. by a thermoregulator. Meanwhile, 0.03 mol/L of cobalt sulfate (guaranteed reagent) solution and 0.15 mol/L of ferrous sulfate (guaranteed reagent) aqueous solution were mixed so that a mixture ratio was Co: Fe1:4 (molar ratio), to thereby prepare a mixed solution. 500 mL of the mixed solution was added to the pure water 3000 mL, which were then mixed with each other, and thereafter granular sodium carbonate was directly added thereto, with an amount of carbonic acid corresponding to five times of total number of moles of Fe and Co in the aforementioned added mixed solution, to thereby prepare a suspension liquid mainly composed of iron carbonate, while adjusting the mixed solution so that a liquid temperature does not exceed a range of 35 ±5° C.

After the suspension liquid was aged for 90 minutes, a nucleus crystal was formed, then the temperature was increased to 60° C., and oxidation was continued for 90 minutes by ventilating pure oxygen, at a flow rate of 30 mL/minute. Thereafter, the pure oxygen was switched to nitrogen, and the suspension liquid was aged for about 45 minutes.

Next, the liquid temperature was decreased to 40° C., to stabilize the temperature of the liquid, and thereafter 1.0 massa of aluminium sulfate aqueous solution was continued to be added for 25 minutes at an addition velocity of 5.0 g/minute, to thereby grow iron oxyhydroxide. Thereafter, the pure oxygen was flown to the suspension liquid, at a flow rate of 50 mL/minute, to thereby complete oxidation. Note that the end point of the oxidation was confirmed by taking-up a small amount of a supernatant solution of the suspension liquid, then adding a hexacyano iron potassium solution thereto, and confirming that a liquid color was not changed.

After oxidation of the suspension liquid was ended, 300g of sulfate aqueous solution of yttrium oxide (containing 2.0 mass % of yttrium) was added to the suspension liquid, to form a solid solution of yttrium, and obtain a powder (cake) of iron oxyhydroxide whose surface is coated with yttrium.

The cake of the iron oxyhydroxide was filtered, collected, and washed by water, and thereafter dried for hours at 130° C., to thereby obtain a dried solid substance of the iron oxyhydroxide. log of the dried solid substance was put in a bucket and sintered for 30 minutes at 450° C. in the atmosphere while adding steam at 1.0 g/minute as moisture content, to thereby obtain an iron-based oxide mainly composed of α-iron oxide (hematite).

The iron-based oxide mainly composed of the α-iron oxide was charged into the bucket where ventilation is possible, and thereafter the bucket was installed in a through type reduction furnace, then hydrogen gas was ventilated at a flow rate of 40 L/minute and sintering was performed for 30 minutes at 400° C. while adding steam at 1.0 g/minute as a moisture content.

After this reduction treatment was ended, supply of the steam was stopped, and the temperature was increased to 600° C. at a temperature increasing velocity of 15° C./minute in a hydrogen atmosphere. Thereafter, reduction treatment was performed at a high temperature for 60 minutes while adding steam at 1.0 g/minute as moisture content, to thereby obtain an iron-based alloy powder of example 1 (metallic magnetic powder as an intermediate product).

Next, in order to remove the non-magnetic component from the iron-based alloy powder, the treatment liquid to be used was adjusted. Specifically, 0.05 mol/L of sodium tartrate, being a complexing agent and 0.1 mol/L of ammonium sulfate, being a buffer agent, were mixed into 900 mL of pure water, to thereby prepare a treatment liquid adjusted to pH9 with $NH_3$.

Then, 10 g of the iron-based alloy powder after reduction treatment was charged into the treatment liquid, and the temperature was maintained to 30° C. Thereafter, 0.3 mol/L of sodium borohydride, being the reduction agent, was added, and the above mixture was then aged while being stirred for 30 minutes at 30° C., to thereby obtain slurry.

A hydrogen peroxide solution obtained by diluting 17.8 g of pure water with 35% of hydrogen peroxide was added to the obtained slurry, and the above mixture was aged for 30 minutes while being stirred. Then, particles were settled from the slurry by natural sedimentation, and supernatant was removed by decantation. Then, 1000 mL of pure water was added and the mixture was stirred again for 30 minutes, to thereby wash the iron-based alloy powder with water. Then, the particles were settled by natural sedimentation again, and further the supernatant mainly composed of the aforementioned water was removed by decantation.

After the aforementioned supernatant was removed, 500 mL of ethanol was added, and in the same way as the above-described water washing, the settled particles were spread over ethanol by stirring at a normal temperature. Thereafter, the particles were settled again by natural sedimentation, and the supernatant mainly composed of the ethanol was removed by decantation. Then, the ethanol was added, and an operation of removing the supernatant mainly composed of ethanol (in the present invention, the operation is called "solvent substituting operation (1)" in some cases.) was repeated five number of times.

After the solvent substituting operation (1) of five number of times was performed, 500 mL of toluene was added to the settled particles. Then, the above mixture was stirred in the same way as the aforementioned solvent substituting operation (1) at a normal temperature, to thereby make the magnetic powder spread over toluene. Thereafter, the particles were settled again by natural sedimentation, and the supernatant mainly composed of toluene was removed by decantation. Then, the toluene was added, and the operation of removing the supernatant mainly composed of toluene (the operation is described as "solvent substituting operation (2)" in some cases.) was repeated four number of times. However, in the fourth solvent substituting operation (2), the supernatant was not removed and the slurry of the metallic magnetic particles, in which toluene was dispersed, was obtained.

The obtained toluene dispersed slurry of the metallic magnetic particles was subjected to treatment for 10 minutes at a rotation number of 4000 rpm by using a centrifugal machine, to thereby forcibly settle the metallic magnetic particles. Then, the supernatant mainly composed of toluene was removed, to thereby separate and obtain the metallic magnetic particles.

The obtained 46.0 g of the metallic magnetic powder (concentration of a solid portion: 11.2 mass %) was added to 1400 g of cyclohexanone, and the above mixture was stirred and dispersed. Then, the slurry was obtained by dispersing the dispersing object by ultrasonic waves, while the liquid temperature was adjusted so as not to exceed 50° C.

Meanwhile, as the organic matter covering the metallic magnetic particle, a treatment liquid obtained by diluting 2.0 g of BIRON UR-8200 (registered trademark) produced by TOYOBO CO., LTD., with 140 g of cyclohexanone, was prepared.

Here, the treatment liquid thus obtained was added into the slurry, and the above mixture was aged while being dispersed by ultrasonic waves for 10 minutes, to thereby obtain the metallic magnetic powder of the present invention, with UR-8200 adsorbed on the surface of each metallic magnetic particle.

In order to evaluate the dispersability of the obtained metallic magnetic powder, 0.5g of the metallic magnetic powder was added to 100mL of cyclohexanone. Then, the above mixture was subjected to dispersion treatment for 10 minutes by using an ultrasonic distributor, to thereby obtain the slurry. Particle sedimentation was not observed in this slurry, and the slurry shows a uniform black color.

Evaluation of dispersability was performed to the, slurry by DLS method.

Specifically, the metallic magnetic powder was added to the cyclohexanone and the concentration of the slurry was set to 0.5 mg/cc, and thereafter the above mixture was subjected to dispersion treatment for 10 minutes by using the ultrasonic distributor. Then, a particle size distribution was measured by using a probe for concentrated solution and using Photal FPAR-1000. The measured particle size distribution was plotted by □ in FIG. 2. Note that FIG. 2 is a graph wherein a presence ratio of the metallic magnetic particles by weight conversion is taken on the vertical axis, and particle diameters are taken on the horizontal axis.

Figure 2:
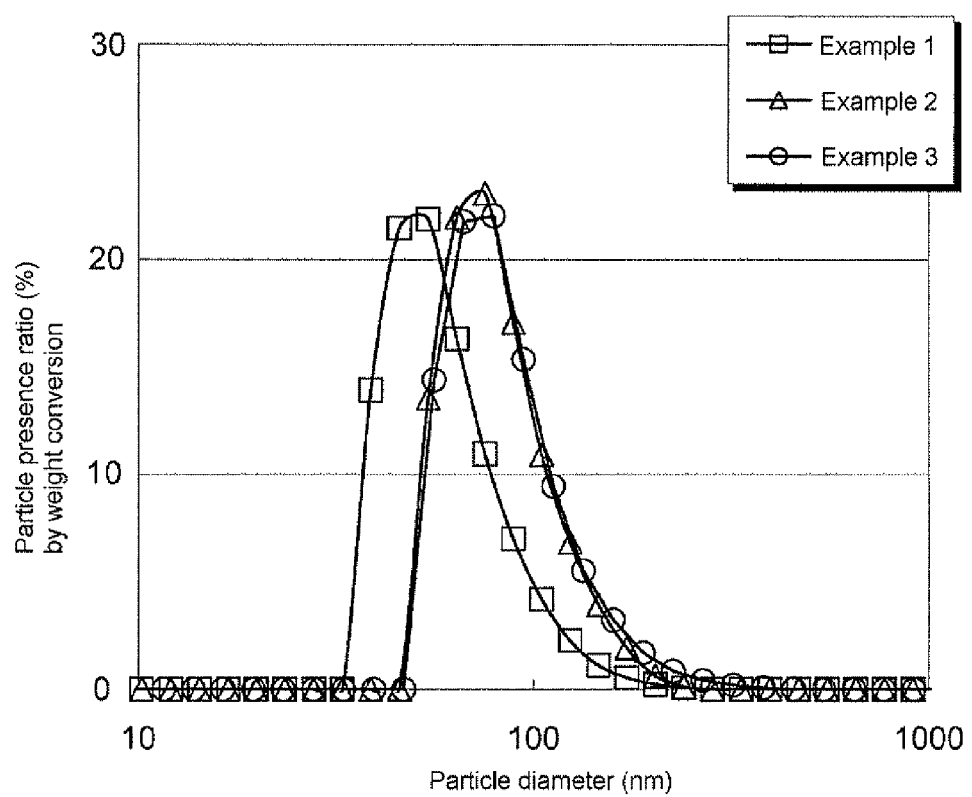
FIG. 2 shows a particle size distribution measured by DDS in an aggregate according to an example.

From the result of FIG. 2, it is found that the metallic magnetic particles with high dispersability can be obtained.

Namely, from the result of FIG. 2, it is found that a peak diameter of the metallic magnetic particle in the slurry by the DLS method was 38.7 nm. Meanwhile, the average major axis diameter of the metallic magnetic powder obtained from the TEM image was 32.1 nm, and therefore the value of the peak diameter/average major axis diameter was 1.21. As is clarified from this result, the average major axis diameter obtained from the TEM image and the peak diameter measured by the DLS method show approximately the same values, and in the slurry, it can be said that the metallic magnetic particles of the example 1 are set in almost a single dispersion state.

The obtained 1.36 g of the metallic magnetic powder, 0.33 g of UR-8200, being a binder, and 3.3 g of solvent in which methyl ethyl ketone, toluene, cyclohexanone were mixed in a ratio of 33:33:34 (mass ratio), were charged into a pot having an inner diameter of 45 mm and a depth of 13 mm. Further, 23 g of zirconia ball (0.50 was added into this pot, leaving this pot at rest for 10 minutes in a state that a lid of the pot was closed.

Then, the pot was set in a planetary ball mill, and a coating mother liquid was obtained by performing dispersion operation for 300 minutes at rotation number of 300 rpm.

Meanwhile, as a letdown solution added to the coating mother liquid, a mixed solution, in which methyl ethyl ketone, toluene, and cyclohexanone were mixed in a ratio of 44.3:44.3:11.3 (mass ratio), was prepared.

1.4 g of the letdown solution was added to the pot, and this pot was installed in the planetary ball mill again, to thereby manufacture the magnetic painting by performing dispersion operation for 20 minutes at the rotation number of 300 rpm.

Contents of the pot were filtered by a PTFE filter (opening: 3.01 m) to separate and obtain only the magnetic painting.

The surface of a base film (polyethylene film 15C-B500 produced by Toray Industries, Inc. having a film thickness of 15 μm) was coated with the obtained magnetic painting by using an applicator with clearance of 55 μm.

Here, the magnetic painting on the base film was dried as it was, and a magnetic tape sample with non-orientation was obtained. Meanwhile, after the surface of the base film was coated with the magnetic painting, the base film was immediately inserted into a magnetic field for 15 minutes, in which a magnetic intensity was 0.5 T, which was then dried, and the magnetic tape sample with orientation was obtained.

Magnetic measurement was performed to the magnetic tape sample with non-orientation by using the VSM apparatus (VSM-7P) produced by Toei Industry Co., Ltd., and coercive force Hcx(Oe, kA/m), magnetic force distribution SFDx in a parallel direction to the surface of the magnetic layer, squareness ratio SQx in a parallel direction to the surface of the magnetic layer, and orientation ratio OR were obtained.

Meanwhile, regarding the oriented magnetic tape sample as well, coercive force Hcx(Oe, kA/m), magnetic force distribution SFDx in a parallel direction to the surface of the magnetic layer, squareness ratio SQx in a parallel direction to the surface of the magnetic layer, squareness ratio SQz in a vertical direction to the surface of the magnetic layer, and orientation ratio OR were obtained.

Measurement results are shown in table 3.

Examples 2, 3

The slurry of the metallic magnetic powder and the magnetic tape sample of examples 2 and 3 were obtained, by performing the same operation as the example 1, excluding a point that the organic matter covering the surface of the metallic magnetic particle, amount of the binder, composition of the solvent, and the mixing ratio of the metallic magnetic powder and the solvent were changed.

Here, amounts of the organic matters of examples 2 and 3 are shown in table 1, and the solvent composition, the mixing ratio of the metallic magnetic powder and the solvent, and the amount of the binder are shown in table 2.

In the obtained slurry of the metallic magnetic powder of the examples 2 and 3, the particles were not settled, and a dispersion state was maintained for a long period of time. Further, the particle size distribution was measured by the DLS method. The result of measurement of the particle size distribution was plotted by □ in FIG. 2 of the example 2, and ○ in FIG. 2 of the example 3.

From the result of FIG. 2, it was found that the peak diameter obtained by the DLS method was 54.0 nm in the metallic magnetic powder of the example 2, and 55.9 nm in the metallic magnetic powder of the example 3. Meanwhile, the average major axis diameter of the metallic magnetic powder obtained from the TEM image was 32.1 nm, and therefore the value of the peak diameter/average major axis diameter was 1.68 in the metallic magnetic powder of the example 2, and 1.74 in the metallic magnetic powder of the example 3.

Further, the same measurement as the example 1 was performed to the magnetic tape samples of the examples 2 and 3. Measurement results are shown in table 3.

Example 4

The slurry of the metallic magnetic powder and the magnetic tape sample of example 4 were obtained by performing the same operation as the example 1, excluding a point that the organic matter covering the surface of the metallic magnetic particle was changed from SUR-8200 to polystyrene-acrylonitrile copolymer (wherein the molecular weight was about 20000 and the ratio of stylene/acrylonitrile was 1/1.5 in which the ratio was adjusted so that the value of acrylonitrile was large.), and the organic matter covering the surface of the metallic magnetic particle, the amount of the binder, the solvent composition, and the mixing ratio of the metallic magnetic powder and the solvent were changed.

Here, the amounts of the organic matters of the example 4 are shown in table 1, and the solvent composition and the mixing ratio of the metallic magnetic powder and the solvent, and the amount of the binder are shown in table 2.

In the obtained slurry of the metallic magnetic powder of the example 4, the particles were not settled and the dispersion state was maintained for along period of time.

Further, the same measurement as the example 1 was performed to the magnetic tape sample of the example 4. Measurement results are shown in table 3.

Comparative Example 1

The slurry and the magnetic tape sample of comparative example 1 was obtained by performing the same operation as the example 1, excluding a point that the surface of the metallic magnetic particle was not coated with the organic matter, and the amount of the binder, the solvent composition, and the mixing ratio of the metallic magnetic powder and the solvent were changed.

Here, the solvent composition, the mixing ratio of the metallic magnetic powder and the solvent, and the amount of the binder of the comparative example 1 are shown in table 2.

In the obtained slurry of the metallic magnetic powder of the comparative example 1, the aggregate of the metallic magnetic particles was settled. Therefore, the particle size distribution by the DLS method could not be measured.

Further, the same measurement as the example 1 was performed to the magnetic tape sample of the comparative example 1. Measurement results are shown in table 3.

From the results shown in table 3, it was found that the magnetic tape having a high orientation ratio and a small coercive force distribution could be obtained by the magnetic tape sample using the metallic magnetic particles of the preset invention. Such an effect can be understood from the fact that the coercive force distribution (SFDx) of the magnetic tape of the examples 1 to 4, and the coercive force distribution of the magnetic tape of the comparative example 1 show approximately the same values in a case of the magnetic tape with non-orientation, but the coercive force distribution of the magnetic tape of the examples 1 to 4 shows smaller values than the value of the coercive force distribution of the magnetic tape of the comparative example 1 in a case of the magnetic tape with orientation.

TABLE 1

| | Raw material slurry | | | | | |
|---|---|---|---|---|---|---|
| | Metallic magnetic powder | Cyclo-hexanone | Treatment liquid | | | |
| | | | Organic matter | | Dispersion liquid | |
| | (g) | (g) | Kind | (g) | Kind | (g) |
| Example 1 | 46.0 | 1400 | UR-8200 | 2.0 | Cyclohexanone | 140 |
| Example 2 | 46.0 | 1400 | UR-8200 | 1.1 | Cyclohexanone | 140 |
| Example 3 | 46.0 | 1400 | UR-8200 | 0.9 | Cyclohexanone | 140 |
| Example 4 | 46.0 | 1400 | (note)SAN | 0.6 | Cyclohexanone | 140 |
| Com. ex* 1 | — | — | — | — | — | — |

(Note)SAN: Polystyrene-acrylonitrile
*Com. ex* . . . Comparative example 1

TABLE 2

| | Magnetic coating mother liquid | | | | | | | Letdown liquid | | | |
|---|---|---|---|---|---|---|---|---|---|---|---|
| | Metallic magnetic powder | Solvent | | | | Binder | | Solvent | | | |
| | Addition | Composition (mass ratio) | | | Addition | | Addition | Composition (mass ratio) | | | Addition |
| | amount (g) | Methyl ethyl ketone | Toluene | Cyclo-hexanone | amount (g) | Kind | amount (g) | Methyl ethyl ketone | Toluene | Cyclohexanone | amount (g) |
| Example 1 | 1.36 | 33.0 | 33.0 | 34.0 | 3.31 | UR-8200 | 0.33 | 44.3 | 44.3 | 11.3 | 1.42 |
| Example 2 | 1.26 | 32.0 | 32.0 | 36.0 | 3.30 | UR-8200 | 0.44 | 44.3 | 44.3 | 11.3 | 1.42 |
| Example 3 | 1.24 | 31.7 | 31.7 | 36.6 | 3.28 | UR-8200 | 0.48 | 44.3 | 44.3 | 11.3 | 1.42 |
| Example 4 | 1.25 | 32.0 | 32.0 | 36.0 | 3.42 | UR-8200 | 0.33 | 44.3 | 44.3 | 11.3 | 1.42 |
| Com ex.* 1 | 2.40 | 1.0 | 1.0 | — | 2.00 | UR-8200 | 0.60 | 44.3 | 44.3 | 11.3 | 1.42 |

Com ex.* . . . Comparative example 1

TABLE 3

| | Magnetic tape (non-orientation) characteristics | | | | | Magnetic tape (orientation) characteristics | | | | | |
|---|---|---|---|---|---|---|---|---|---|---|---|
| | Hcx | | | | | Hcx | | | | | |
| | (Oe) | (kA/m) | SFDx | SQx | OR | (Oe) | (kA/m) | SFDx | SQx | OR | SQz |
| Example 1 | 2281 | 181.5 | 0.67 | 0.64 | 1.0 | 2576 | 205.0 | 0.36 | 0.94 | 3.5 | 0.14 |
| Example 2 | 2290 | 182.2 | 0.67 | 0.64 | 1.0 | 2634 | 209.6 | 0.37 | 0.94 | 3.6 | 0.14 |
| Example 3 | 2317 | 184.4 | 0.65 | 0.64 | 1.0 | 2661 | 211.8 | 0.39 | 0.94 | 3.7 | 0.15 |
| Example 4 | 2306 | 183.5 | 0.67 | 0.64 | 1.0 | 2591 | 206.2 | 0.38 | 0.93 | 3.4 | 0.15 |
| Com ex.* 1 | 2368 | 188.4 | 0.67 | 0.62 | 1.0 | 2653 | 211.1 | 0.47 | 0.88 | 2.6 | 0.21 |

Com ex.* . . . Comparative example 1

If the metallic magnetic powder of the present invention is used, a magnetic recording medium suitable for high density magnetic recording can be provided. Further, by adjusting the structure of the organic matter covering the surface of the metallic magnetic particle, it can be considered that the metallic magnetic powder can be used for the purpose of use for DDS (Drug Delivery System), and the powder itself can action as a medicine.

What is claimed is:

1. A manufacturing method of a metallic magnetic powder, comprising the steps of:
    manufacturing the metallic magnetic powder consisting of metallic magnetic particles that contain Fe, or Fe and Co having a metallic magnetic phase as main components, and non-magnetic components comprising rare earth elements, wherein yttrium is also treated as one of the rare earth elements, and at least one of Al and Si;
    removing the non-magnetic components from the metallic magnetic particles by reacting a reducing agent with the non-magnetic components in water where a complexing agent that forms a complex with the non-magnetic components exists in water;
    oxidizing the metallic magnetic particles from which the non-magnetic components are removed by using aqueous oxidant, following the step of the removing without drying the metallic magnetic particles;
    cleaning the oxidized metallic magnetic particles in water;
    substituting an organic solvent for water adhered to the oxidized metallic magnetic particles; and
    coating surfaces of the metallic magnetic particles with an organic matter different from the organic solvent, in a state of maintaining a wet condition of the metallic magnetic particles with the organic solvent adhered thereto.

2. The manufacturing method of the metallic magnetic powder according to claim 1, wherein the aqueous oxidant for oxidizing the metallic magnetic particles is peroxide.

3. The manufacturing method of the metallic magnetic powder according to claim 1, wherein the organic matter different from the organic solvent covering the surfaces of the metallic magnetic particles has a molecular weight of 100 or more, which is larger than the molecular weight of the organic solvent.

4. The manufacturing method of the metallic magnetic powder according to claim 1, wherein the organic matter different from the organic solvent covering the surfaces of the metallic magnetic particles has a structure containing a sulfonic acid group and/or a phosphonic acid group.

5. The manufacturing method of the metallic magnetic powder according to claim 1, further comprising a step of:
    drying the metallic magnetic powder after the step of covering the surfaces of the metallic magnetic particles with the organic matter different from the organic solvent.

* * * * *

UNITED STATES PATENT AND TRADEMARK OFFICE
CERTIFICATE OF CORRECTION

PATENT NO. : 8,932,668 B2  
APPLICATION NO. : 13/103410  
DATED : January 13, 2015  
INVENTOR(S) : Dong Chul Pyun et al.

Page 1 of 1

It is certified that error appears in the above-identified patent and that said Letters Patent is hereby corrected as shown below:

On the Title Page

Please delete the following;

Item "(73) Assignees: The Arizona Board of Regents on Behalf of The University of Arizona, Tuscon, AZ (US); Materials Co., Ltd., Tokyo (JP)"

And replace with:

(73) Assignees: The Arizona Board of Regents on Behalf of The University of Arizona, Tuscon, AZ (US); Dowa Electronics Materials Co., Ltd., Tokyo (JP)

Signed and Sealed this  
Fifth Day of May, 2015

Michelle K. Lee  
*Director of the United States Patent and Trademark Office*